W. R. WETMORE & J. HEGARTY.
FOUNTAINS.

No. 182,251. Patented Sept. 12, 1876.

Witnesses
Harvey L. Page
Bertram Zevely

Inventors:
William R. Wetmore
John Hegarty
by their attorneys
Pollok & Bailey

UNITED STATES PATENT OFFICE.

WILLIAM R. WETMORE, OF LINCOLNTON, N. C., AND JOHN HEGARTY, OF NEW YORK, N. Y., ASSIGNORS TO SAID HEGARTY AND ALANSON H. TIFFT, OF NEW YORK, N. Y., AND WILLIAM R. WETMORE, OF LINCOLNTON, N. C.

IMPROVEMENT IN FOUNTAINS.

Specification forming part of Letters Patent No. 182,251, dated September 12, 1876; application filed August 29, 1876.

*To all whom it may concern:*

Be it known that we, WILLIAM R. WETMORE, of Lincolnton, North Carolina, and JOHN HEGARTY, of the city and State of New York, have invented certain new and useful Improvements in Fountains, of which the following is a specification:

Our invention relates to small portable fountains, designed, principally, for ornament or use in dwellings, &c.

The fountain in which our invention is comprised is a reversible fountain, consisting of two reservoirs, each provided with a jet, and so connected that the reservoir which is uppermost shall supply water to the jet of the reservoir below, while the water thus discharged from the jet shall enter and gather in the lower reservoir in readiness for use when the fountain is reversed. We also provide means, consisting of one of the supporting-columns, for supplying air to the reservoirs to take the place of the water passing out therefrom. We also combine with the fountain a separate base or stand, which fits and holds the reservoir that may be undermost, and receives and retains any surplus water.

The nature of our invention, and the manner in which the same is or may be carried into effect, will be readily understood by reference to the accompanying drawing, in which—

Figure 1:
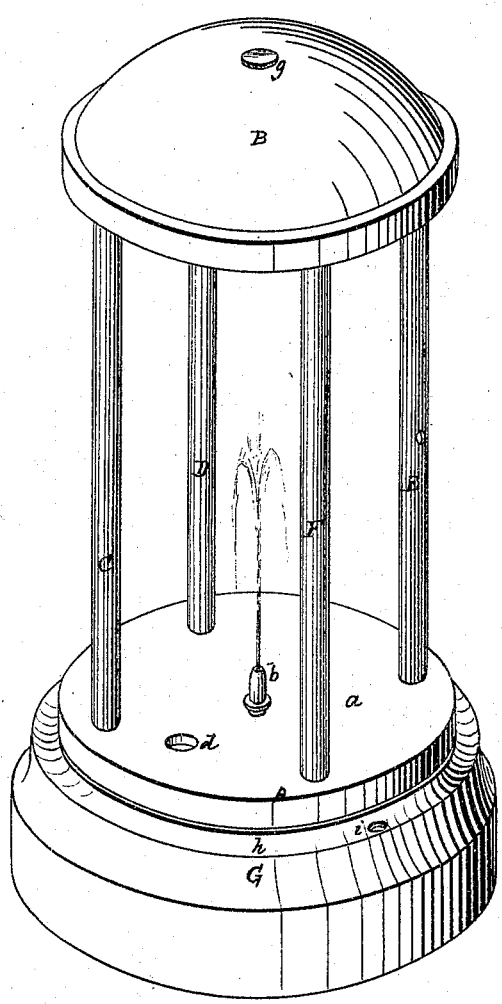
Figure 2:
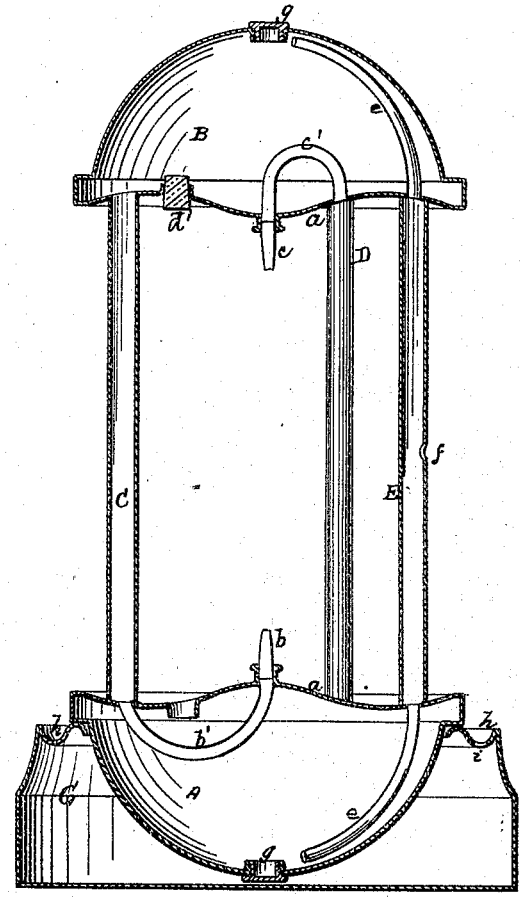

Figure 1 is a perspective view of our improved fountain. Fig. 2 is a vertical central section of the same.

The fountain proper consists of the two reservoirs A B, the tubular columns C D E F, and the parts contained therein. The reservoirs A B are counterparts of one another. Their contiguous faces $a$ are nearly flat, being slightly dished or concave, so as to hold the water discharged from the central jets $b$ $c$. The jet $b$ of reservoir A communicates, by a curved pipe, $b'$, with the tubular column C, which, at the other end, opens into reservoir B. When the latter reservoir is uppermost, as shown, the only escape for the water contained therein is down through the column C, thence through pipe $b'$ and jet $b$. The head of water thus provided causes the water to issue from jet $b$, as indicated in Fig. 1. The water falls on the face $a$ of the reservoir A, and enters the latter through a hole, $d$. The reservoir B is provided with a like hole, which, however, is closed by a stopper, $d'$. This stopper is removed when reservoir B is empty, and is put in the hole of reservoir A before the fountain is reversed, to bring the latter reservoir uppermost. Jet $c$ communicates, through a pipe, $c'$, with column D, which, at its other end, opens into reservoir A.

To supply air to the reservoirs as they are being emptied of water, I make use of a tubular column, E, which, at each end, connects with a pipe, $e$, that extends up in close proximity to the apex of the dome of the reservoir, so that in each reservoir, as it comes uppermost, the end of pipe $e$ will be above the level of the water therein. A small perforation, $f$, is made in column E, through which air may enter the column, and pass through the pipe $e$ into the reservoir to take the place of the water flowing therefrom. Each reservoir on its outer face is provided with an opening, closed by a screw-cap or plug, $g$, through which, when desired, the reservoir may be filled or emptied. These screw-caps may, if desired, be formed or provided with sockets or holders to contain flowers.

The above comprises a description of the fountain proper. Whichever reservoir is undermost rests in a base or stand, G, from which the fountain can be lifted whenever desired. This base or stand is hollow, and may be of any suitable external configuration. Around the point where the fountain rests on it, we prefer to form an annular depression or trough, $h$, with holes $i$. This serves to catch any surplus water from the fountain, and to direct it into the interior of the base G.

The fountain may be of any suitable external configuration, and may be made highly ornamental.

Having described our invention, what we claim, and desire to secure by Letters Patent, is—

1. The combination, substantially as set forth, of the two reservoirs, each provided with a jet, which communicates with the other reservoir alone, as and for the purposes described.

2. The two reservoirs, the jets, and the intermediate columns, through which the jets are put in communication with their respective reservoirs, in combination with the air-supply tubes, extending within the reservoirs, and the column or columns through which air is supplied to said tubes.

3. The reversible fountain, in combination with a separate supporting base or stand, substantially as set forth.

4. The supporting base or stand, formed substantially as described, to receive and retain surplus water, in combination with the independent reversible fountain.

5. A bodily reversible fountain, formed of two reservoirs, arranged one above the other, as described, each of which is provided with or carries a jet that communicates with, and receives its supply of liquid from, the other reservoir, substantially as set forth.

In testimony whereof I have hereunto signed my name this 24th day of August, A. D. 1876.

WILLIAM R. WETMORE.

Witnesses to WETMORE'S signature:
W. R. EDWARDS,
J. E. BOGER.

In testimony whereof I have hereunto signed my name this 28th day of August, A. D. 1876.

JOHN HEGARTY.

Witnesses to HEGARTY'S signature:
J. P. DILLON,
A. J. ORTON.